A. COSTANTINO.
RUBBER HEEL.
APPLICATION FILED FEB. 18, 1921.
1,423,399.  Patented July 18, 1922.
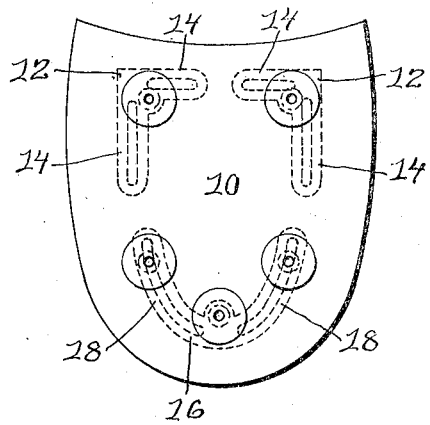
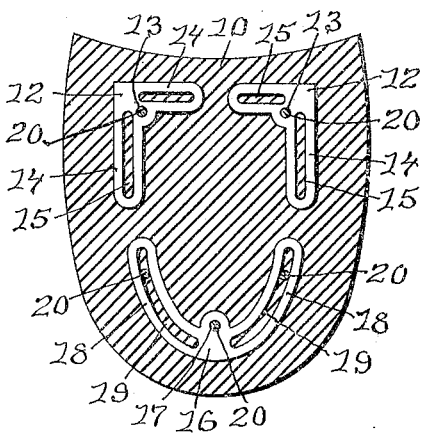
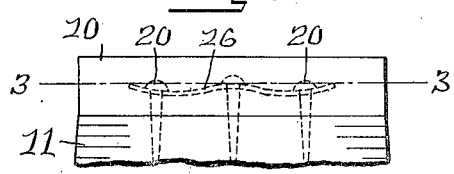
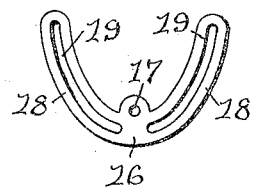
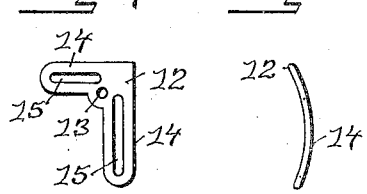
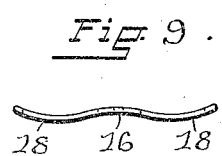
INVENTOR:
Alix Costantino
By Chas. H. Luther
ATTORNEY.

UNITED STATES PATENT OFFICE.

ALIX COSTANTINO, OF PROVIDENCE, RHODE ISLAND.

RUBBER HEEL.

1,423,399.

Specification of Letters Patent.

Patented July 18, 1922.

Application filed February 18, 1921. Serial No. 446,100.

*To all whom it may concern:*

Be it known that I, ALIX COSTANTINO, a citizen of Italy, residing at Providence, in the county of Providence and State of Rhode Island, have invented a new and useful Improvement in Rubber Heels, of which the following is a specification.

My invention has reference to an improvement in the heels of boots, shoes and the like and more particularly to an improvement in rubber heels and the means for securing the rubber heels to the leather heels of the shoes.

In nailing rubber heels to the leather heels of shoes and the like, the rubber heels are usually cemented to the leather heels, as well as nailed, to hold the rubber heel tight against the leather and to prevent the rubber heel from parting or working away from the leather. It requires a considerable length of time for the cement to dry, there is the cost of the cement and the time and labor required in applying the same, and the time required for the cement to dry, prohibits quick securing of the rubber heel to the heel of the shoe, when necessary, also when the adhesiveness of the cement gives out, as it usually does before the rubber heels wear out, the rubber heels will separate from the leather heels, and allow water, slush and mud to penetrate between the rubber and leather heels of the shoes.

The object of my invention is to improve the construction of a rubber heel whereby all of the above enumerated disadvantages are eliminated and the rubber heel may be quickly, firmly and tightly secured to a leather heel by nails, and tightly held to the leather heel under spring tension, thereby eliminating the use of cement.

My invention consists in the peculiar and novel construction of a rubber heel, said rubber heel having spring means embedded in the rubber heel and details of construction, whereby when the rubber heel is nailed to a leather heel, the rubber heel will be held tightly against the leather heel under spring tension, as will be more fully set forth hereinafter, and claimed.

Figure 1 is a face view looking at the tread of my improved rubber heel and indicating the embedded spring fastening members in dotted lines.

Figure 2 is a rear edge view of the rubber heel and a portion of a leather heel.

Figure 3 is a sectional view through the rubber heel taken on line 3, 3 of Figure 2 and showing the spring fastening members in full lines.

Figures 4, 5 and 6 are face, side edge and end edge views respectively, of one of the L shaped spring corner fastening members, and Figures 7, 8 and 9 are face, side edge and rear end edge views respectively of the semicircular spring rear fastening member.

In the drawing 10 indicates my improved spring embedded rubber heel and 11 the tread portion of a leather heel. The rubber heel 10 has embedded in it adjacent each corner an L shaped spring fastening member 12, as shown in Figures 3 and 4. Each L shaped spring fastening member 12 has a central nail hole 13, and spring arms 14, 14 curved as shown in Figures 5 and 6 and each arm 14 has a longitudinal slot 15, as shown in Figure 4. Embedded also in the rubber heel adjacent the rear edge is a U shaped spring fastening member 16 having a central nail hole 17 and spring arms 18, 18 curved as shown in Figures 8 and 9 and each arm 18 has a longitudinal slot 19, as shown in Figures 3 and 7. When the rubber heel is made the rubber unites through the slots 15, 15 in the L shaped fastening members 12, 12 and in the slots 19, 19 in the U shaped fastening member 16 and holds the fastening members more securely in place.

My improved rubber heel is secured to a leather heel by placing the rubber heel on the leather heel and driving nails 20, 20 through the usual nail holes in the rubber heel, through the nail holes 13, 13 in the L shaped fastening members 12, 12; through the nail hole 17 and the slots 19, 19 in the U shaped fastening member 16, as shown in Figures 1 and 2, into the leather heel. In driving the nails home the heads of the nails engage with the spring fastening members and force the spring arms of the fastening members towards the leather heel thereby increasing the tension of the spring arms. The spring tension of the spring arms now forces the rubber heel tightly against the leather heel and holds the same against the leather heel under spring tension.

I do not wish to confine myself to the number used or to the shape of the spring fastening members, the object being to embed spring fastening members in a rubber heel, so that when the rubber heel is nailed to a leather heel, the inner face of the rubber heel will be firmly held against the face of the leather heel, under spring tension.

Having thus described my invention I claim as new:—

A rubber heel, having a plurality of spring fastening means for securing the rubber heel under spring tension to the heel of a shoe, boot or the like, said spring fastening means consisting of L shaped spring fastening members embedded in and adjacent the corners of the rubber heel and having a nail hole, curved spring arms, and slots in the spring arms through which the rubber unites, and a U shaped spring fastening member embedded in and adjacent the rear end of the rubber heel and having a nail hole, curved spring arms and slots in the spring arms through which the rubber unites, all for the purpose as described.

In testimony whereof, I have signed my name to this specification.

ALIX COSTANTINO.